(12) United States Patent
Brouillette

(10) Patent No.: US 7,428,851 B2
(45) Date of Patent: Sep. 30, 2008

(54) SENSOR ARRAYS BASED ON ELECTRONIC OSCILLATORS

(75) Inventor: Martin Brouillette, Sherbrooke (CA)

(73) Assignee: Universite de Sherbrooke, Quebec (CA)

( * ) Notice: Subject to any disclaimer, the term of this patent is extended or adjusted under 35 U.S.C. 154(b) by 147 days.

(21) Appl. No.: 11/172,603

(22) Filed: Jun. 30, 2005

(65) Prior Publication Data

US 2006/0065048 A1  Mar. 30, 2006

Related U.S. Application Data

(60) Provisional application No. 60/583,596, filed on Jun. 30, 2004.

(51) Int. Cl.
*G01M 19/00* (2006.01)
(52) U.S. Cl. ..................................................... 73/866.1
(58) Field of Classification Search ................ 73/866.1, 73/116, 117.3
See application file for complete search history.

(56) References Cited

U.S. PATENT DOCUMENTS

| | | |
|---|---|---|
| 3,713,045 A | 1/1973 | Usuda et al. |
| 4,190,823 A | 2/1980 | Leichle |
| 4,609,882 A | 9/1986 | Gehring et al. |
| 6,472,945 B1 | 10/2002 | Gumm |

FOREIGN PATENT DOCUMENTS

| | | | |
|---|---|---|---|
| EP | 0118605 | 9/1984 | |
| EP | 0254445 | 1/1988 | |
| EP | 0676638 | 10/1995 | |
| WO | WO 9502174 A1 * | 1/1995 | ............... 73/116 |

OTHER PUBLICATIONS

Nieberding et al., "High-Temperature Electronic Requirements in Aeropropulsion Systems", IEEE Transactions on Industrial Electronics, vol. IE-29, No. 2, May 1982, pp. 141-144.
Hunter et al., "An Overview of High-Temperature Electronics and Sensor Development at NASA Glenn Research Center", Journal of Turbomachinery, vol. 125, Oct. 2003, pp. 658-664.

(Continued)

*Primary Examiner*—Thomas P Noland
(74) *Attorney, Agent, or Firm*—Fay Kaplun & Marcin, LLP

(57) ABSTRACT

A sensor array for measuring various parameters in a machine environment, the sensor array comprising a number of oscillators, each of the oscillators comprising a feedback network, an amplifier and a limiter being connected together in a loop. The feedback network has a frequency which varies with the parameters to be measured. The amplifier consumes a current from a current supply and in cooperation with the feedback network produces a signal that alternates at the natural frequency of the feedback network. The limiter limits the amplitude of the signal within a predetermined amplitude range. All of the signals from the oscillators are multiplexed onto the output of the sensor array. Frequency analysis may then used to isolate the individual readings from each of the oscillators.

57 Claims, 13 Drawing Sheets

OTHER PUBLICATIONS

Ruff et al., "SIC Devices: Physics and Numerical Simulation", IEEE Transactions on Electron Devices, vol. 41, No. 6, Jun. 1994, pp. 1040-1054.

Shenai et al., "Optimum Semiconductors for High-Power Electronics", IEEE Transactions on Electron Devices, vol. 36, No. 9, Sep. 1989, pp. 1811-1823.

Palmour et al., "High-Temperature Depletion-Mode Metal-Oxide-Semiconductor Field-E_ect Transistors in Beta-SIC Thin Films", Applied Physics Letters, vol. 51, No. 24, Dec. 1987, pp. 2028-2030.

Palmour et al., "6H-Silicon Carbide Transistors for High Temperature Operation", Proceedings of First International High Temperature Electronics Conference, Albuquerque, NM, vol. 1, 1991, pp. 511-518.

Scozzie et al., "Modeling the Temperature Response of 4H Silicon Carbide Junction Field-Effect Transistors", Journal of Applied Physics, vol. 81, No. 11, Jun. 1997, pp. 7687-7689.

Lee, "The Design of CMOS Radio-Frequency Integrated Circuits", Cambridge University Press, 1998, pp. 38-39.

Chen et al., "Solid-state Reaction of Pt Thin Film with Single-crystal", Journal of Materials Research, vol. 9, No. 3, Mar. 1994, pp. 648-657.

ASTM International, "Standard Specification for Industrial Platinum Resistance Thermometers", Standard E., 1997, pp. 448-453.

* cited by examiner

SENSOR ARRAYS BASED ON ELECTRONIC OSCILLATORS

CROSS-REFERENCE TO RELATED APPLICATION

This application claims the benefits of U.S. provisional patent applications No. 60/583,596 filed Jun. 30, 2004; which is hereby incorporated by reference.

FIELD OF THE INVENTION

The present invention relates to an oscillator-based sensor array.

BACKGROUND OF THE INVENTION

In-flight monitoring of gas turbine engines allows the elaboration of adaptive maintenance plans. By periodically communicating engine data to its service center, the aircraft operator benefits from recommendations from maintenance experts. With additional sensors, maintenance tasks can focus on specific vulnerable parts, rather than reacting to the general behavior of the engine. Design engineers can also anticipate specific problems before they happen, and start working on pre-emptive design modifications. It is well recognized that development work spreads over the useful life of an engine, as some unexpected durability problems, often related to cyclic operation, arise only on aircraft wings.

For the aircraft operator, performance gains are expected from better instrumentation associated with feedback control. Indeed, since engines are currently designed with safety margins, to ensure durability in all conditions, some engines are not operated to the full capabilities of their components. For example, knowing about the severity of the treatment imposed to the most vulnerable turbine parts, it becomes possible to assess the actual thrust capability of a particular engine. Throttle pushes, and hence increases in operating temperatures, can then be applied to healthier engines without sacrificing safety. In addition to pure power gains, reductions in fuel consumption are also possible in the same way, as increasing operating temperatures can improve engine cycle efficiency.

Furthermore, ground tests are expensive, accounting for engine manufacturing, assembly and disassembly costs, and test cell operation costs. Such expenses justify any push toward using as many sensors as possible at one time. In order to validate analytical models, engineers need more than post-testing observations of component deterioration: they need temperature, pressure, and strain real-time measurements, at every running condition of the tests. This detailed lower level information allows to find the root flaws of models. Better monitoring also offers the possibility of shorter tests, avoiding the necessity of reaching high deterioration levels to make useful observations. Experimental parts can therefore be reused for multiple tests.

In instrumenting low access components such as the high pressure turbine of an aircraft engine, lead routing represents a considerable problem, with conventional sensing technology. Each thermocouple, pressure sensor, or strain gauge generally requires a pair of wires to be routed out to the data acquisition system, using a dedicated data transfer slip-ring when installed on a rotating part. This leads to overcrowding of communication lines in low access locations, and requires a large number of data transfer slip-rings when monitoring rotating parts.

The gas turbine engine optimization process requires considerable ground testing and flight experience, and despite all efforts still carries considerable safety margins. In this context, the industry would get considerable benefits from better instrumenting the most vulnerable engine components.

SUMMARY OF THE INVENTION

The present invention relates to a sensor array for measuring various parameters in a machine environment. The sensor array comprises a plurality of oscillators and an output onto which are multiplexed the signals from each of the oscillators. Each of the oscillators includes a feedback network having a natural frequency which varies with a parameters to be measured, an amplifier which works in cooperation with the feedback network to generate a signal that alternates at the natural frequency of the feedback network and a limiter so configured as to limit the signal within a predetermined range. The feedback network, the amplifier and the limiter being interconnected in a loop.

The foregoing and other objects, advantages and features of the present invention will become more apparent upon reading of the following non restrictive description of an illustrative embodiment thereof, given by way of example only with reference to the accompanying drawings.

DETAILED DESCRIPTION

The following disclosure presents in detail a sensor array according to an illustrative embodiment of the present invention. Potential applications will be presented thereafter, with an emphasis on high temperature instrumentation for aircraft engines. However, it should be understood that applications other than high temperature instrumentation for aircraft engines are possible.

A new type of sensor array using emerging microtechnologies is proposed for operation in machine environment. The proposed sensor array is intended to measure distributions of various parameters, like temperatures, pressures, strains, airflows, etc., in transient as in steady state, to enable ground testing, health monitoring and control of low access machine components. The concept offers several advantages over the existing measuring techniques. Specifically, it uses active semiconductor devices to multiplex the signals of a number of sensors onto the same leads. This avoids overcrowding of communication lines in low access locations, and minimizes the number of required data transfer slip-rings when monitoring rotating parts.

Various multiplexing strategies may be employed, e.g. amplitude modulation (AM), frequency modulation (FM), or digital multiplexing. For example, FM may be implemented in a sensor array, by making the sensors generate waveforms by themselves, each within a dedicated frequency band.

Using this concept, a common pair of leads may be used to communicate the readings of a number of sensors using frequency modulation. Each sensor is by itself an oscillator which generates a quasi-sinusoidal signal maintained within one of the reserved frequency bands. The frequency of each signal varies with the local parameter to be measured, but stays within its reserved band. Advantageously, only one channel may be used to acquire the multiplexed signal, and frequency analysis may then be used to isolate the individual readings from one another.

Figure 1:
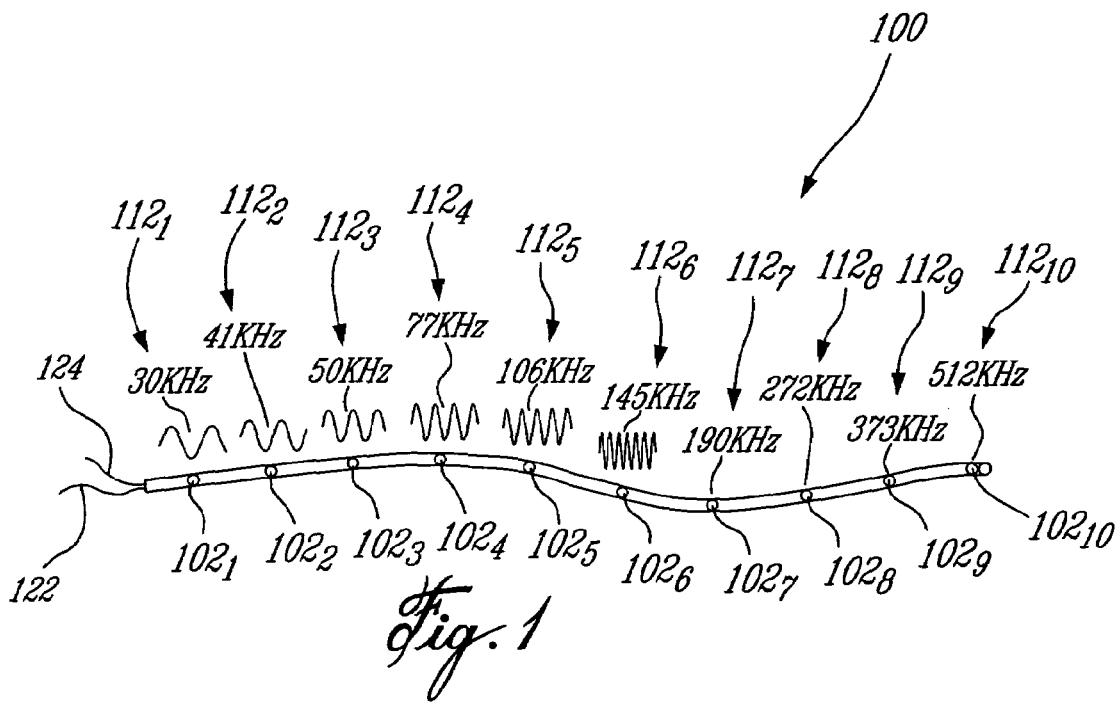
FIG. 1 is an illustration of the sensitive wire concept.
Figure 2:
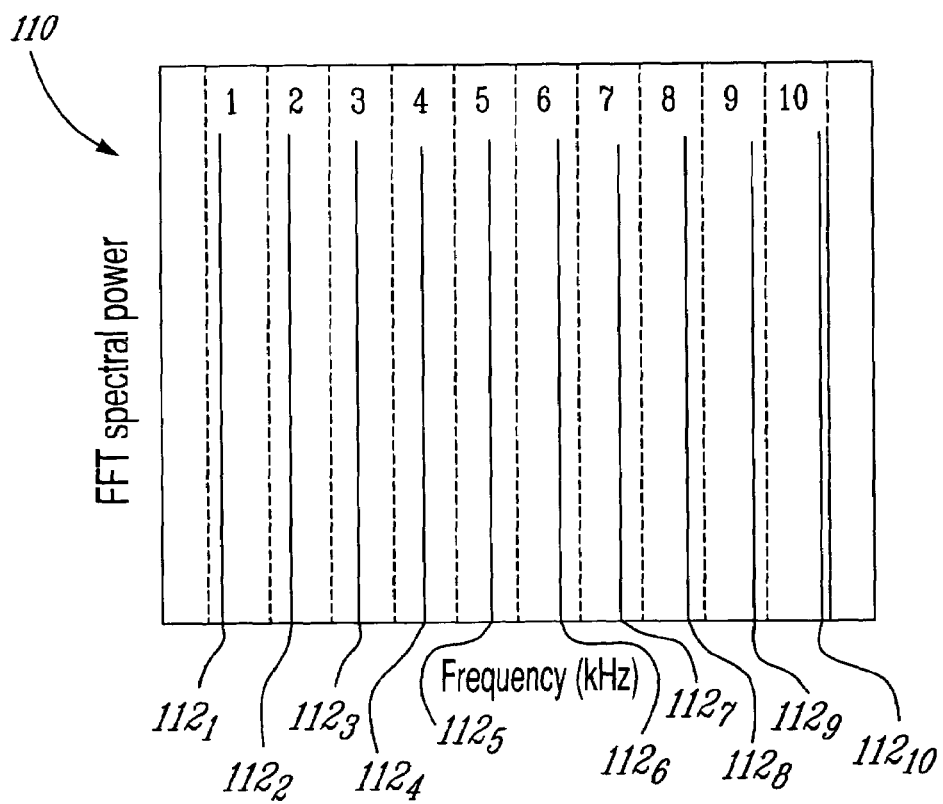
FIG. 2 is a graph of a typical multiplexed signal obtained from a sensor array.

Since the sensors of the sensor array are intended to be very small, the resulting sensor array may be seen as a sensitive wire. FIG. 1 shows a sensor array 100 having 10 sensors $102_1$ to $102_{10}$, interconnected by leads 122 and 124, with their respective assigned frequencies $112_1$ to $112_{10}$. This sensor array 100 may be designed with various sensor spacing, and various numbers of frequency bands, depending on the application. FIG. 2 shows the frequency domain multiplexed signal 110 resulting from the combination of each of the individual sensors $102_1$ to $102_{10}$ frequencies $112_1$ to $112_{10}$.

Reserving a frequency band for each sensor limits the possible number of sensors per sensor array. Another modulation approach that may be used consists in allowing the frequency bands to overlap each other, and to use temporal signal evolution to distinguish measurements from one another. Using this approach, a larger number of sensors may be integrated within a single array. One skilled in the art will understand that more complex algorithms are required to treat the multiplexed signal in this case.

At each measuring point (individual sensors $102_1$ to $102_{10}$) of the sensor array 100, various means may be employed to generate an oscillating signal. The basic principle of the oscillator 150 used in the illustrative embodiment of the present invention is schematized in FIG. 3. Three main components are used: a feedback network 152, an amplifier 154 and a limiter 156 which are all connected together in a loop configuration. Around this loop, in order to produce an oscillation, the total gain is greater than unity, and the total signal phase shift corresponds to a finite number of cycles. The limiter 156 is used to maintain the oscillator 150 within a predetermined amplitude range, and hence to protect the looped components from overloading. Without this limiter 156, the signal would be amplified until the amplifier 154 reaches saturation, or until one of the components fails.

The feedback network 152 may be any physical component that reacts preferentially to different excitation frequencies, e.g. a vibrating beam or a quartz piezoelectric crystal characterized by a natural frequency, or an electronic circuit. The frequency response of the network varying with the parameter to be measured.

For example, the feedback network 152 may be a structure whose natural frequency is influenced by temperature. This may be achieved by using a mismatch in thermal expansion coefficients to make the structure pre-stress level to vary with temperature. The pre-stress level influences the frequency response of the structure, and, consequently, the frequency response of the structure (the feedback network 152) depends on temperature (the measured parameter). Pressure may be used in the same way to change the frequency response of membranes, by pre-stressing them, and the result is in this case a pressure-dependent feedback network.

The limiter 156 may either be mechanical, in the case of vibrating devices, or electrical. For example, mechanical stoppers may limit the displacements of vibrating structures, whereas diode bridges or heating elements may limit voltages and currents, respectively. The limiter 156 may operate on any component of the oscillator 150, or along any of its connection lines. Its location is not limited to the one shown in FIG. 3.

Figure 4:
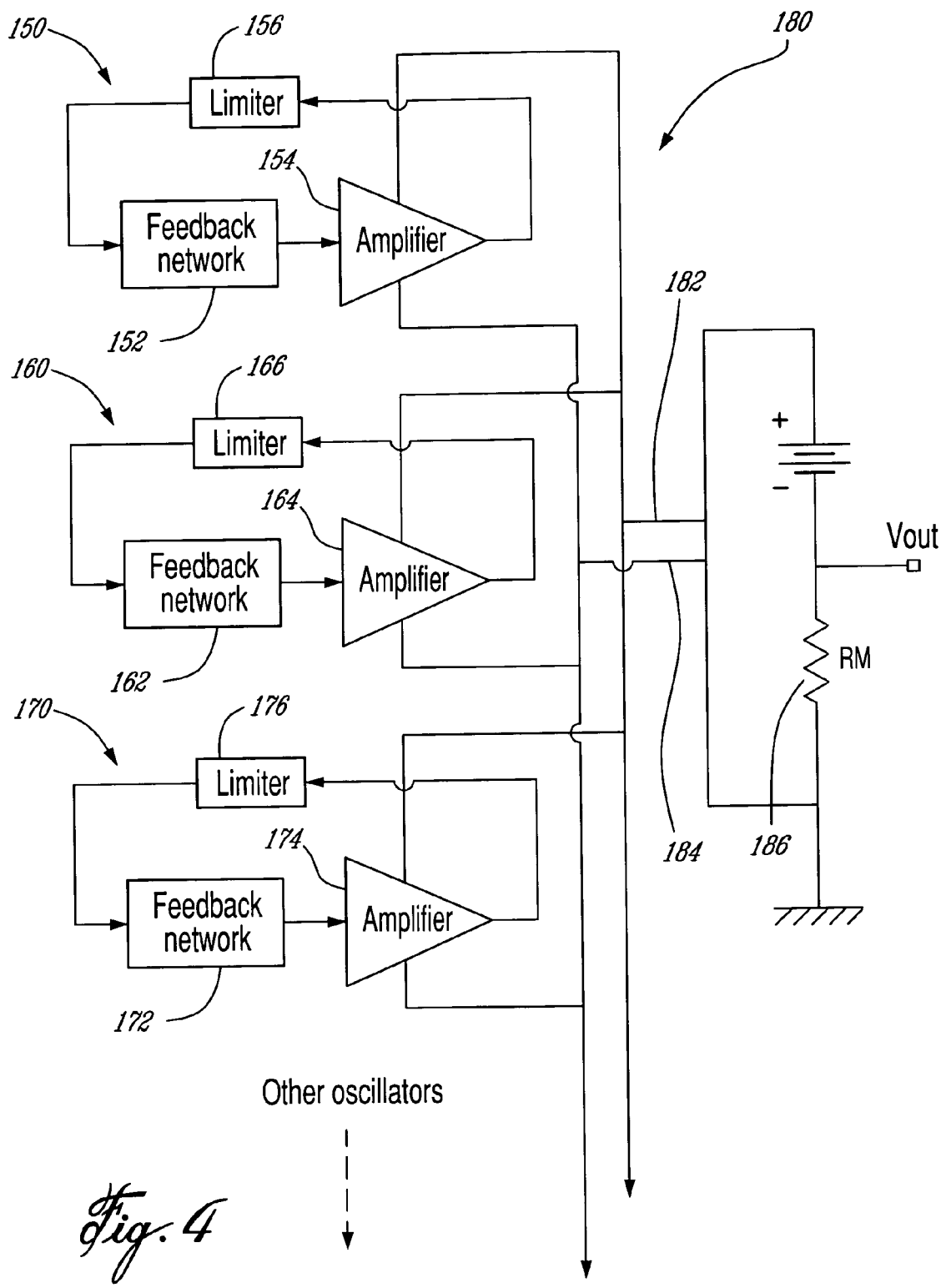
FIG. 4 is a schematic block diagram of the oscillator multiplexing principle based on addition of amplifier currents.

The amplifier 154 may be made of active electronic components, and it is the power consumed by this amplifier 154 that is used for multiplexing. Referring to FIG. 4, a sensor array 180 including a plurality of individual oscillators (three shown) 150, 160 and 170 will be described.

When they are in operation, each amplifier 154, 164, 174 consumes a current that alternates at the frequency of the corresponding oscillator 150, 160, 170 around a certain DC value. The currents for all of the individual oscillators 150, 160, 170 of the sensor array 180 are supplied through the same two wires 182 and 184, which carry the frequency content from each of the oscillators 150, 160, 170. Measuring the current through one of these two leads 182, 184, and performing a frequency analysis, allows the recuperation of the oscillating frequency of each of the individual oscillators 150, 160, 170 of the sensor array 180. The current may be read, for example, by measuring the voltage drop across resistor RM 186.

DETAILED ILLUSTRATIVE EMBODIMENT

The detailed non-restrictive illustrative embodiment presented here uses only electronic components, for simplicity of integration. Many types of electronic oscillators are available, e.g. RC and LC oscillators, negative resistance oscillators, multivibrators, etc. In the illustrative embodiment, the following criteria were considered, in a non limitative manner, in the selection of one type of electronic oscillator:

- inductors have not yet reached an acceptable level of miniaturization in integrated circuits, and thus may be discarded from the oscillator design, though further technological developments may change this situation;
- in order to do efficient frequency modulation, the generated signal may be advantageously as close as possible to a sinusoidal waveform;
- only the behavior of passive components of the feedback network 154 influence the oscillating frequency (for example, the temperature sensitivity of active components, like transistors or diodes, does not influence the oscillating frequency).

Based on those criteria, RC oscillators may be considered as valuable candidates, and in particular phase-shift and Wien bridge oscillators. Both these oscillators do not require inductors, and may generate almost sinusoidal waveforms. Their oscillation frequencies are independent from transistor or diode behavior and may be adjusted by changing resistor or capacitor values only.

Phase-shift Oscillator

Figure 5:
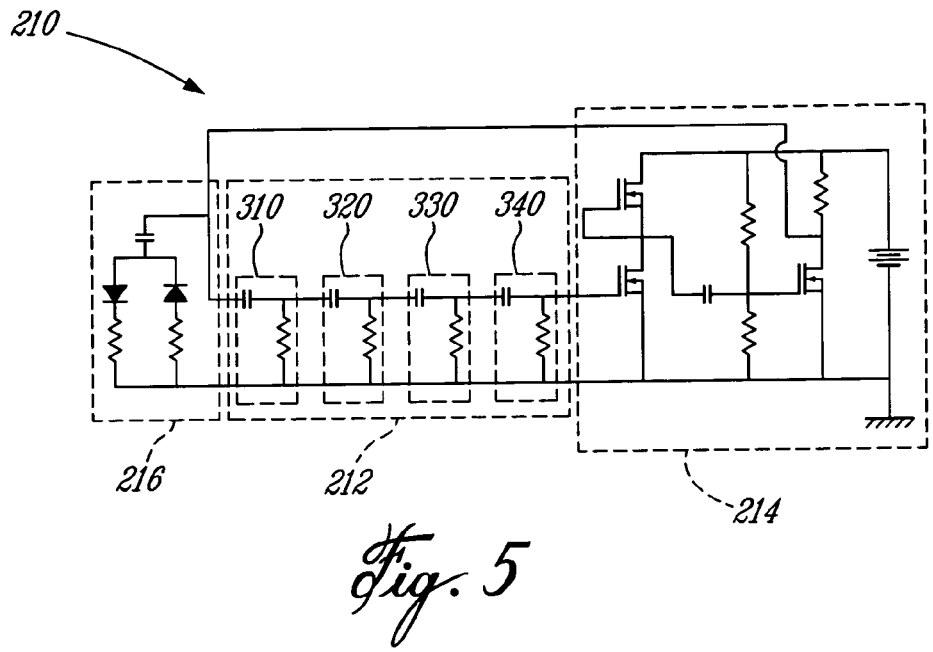
FIG. 5 represents the circuit of a phase-shift oscillator.

A phase-shift oscillator 210 used as an individual oscillator, is schematized in FIG. 5. It is composed of a high-pass feedback network 212, an amplifier 214 and a diode limiter 216. Ideally, the amplifier 214 produces a signal phase shift of 180° that is independent of frequency. The feedback network 212 contains four high-pass filters 310, 320, 330, 340 connected in series that together provide an additional 180° phase-shift at one particular frequency. If the gain of the amplifier 214 is sufficiently high to compensate for the losses through the feedback network 212, at this particular frequency, oscillation occurs. The oscillation frequency simply corresponds to the frequency for which the feedback network 212 produces a 180° phase-shift, with the result of 360° total phase-shift around the loop.

Figure 6:
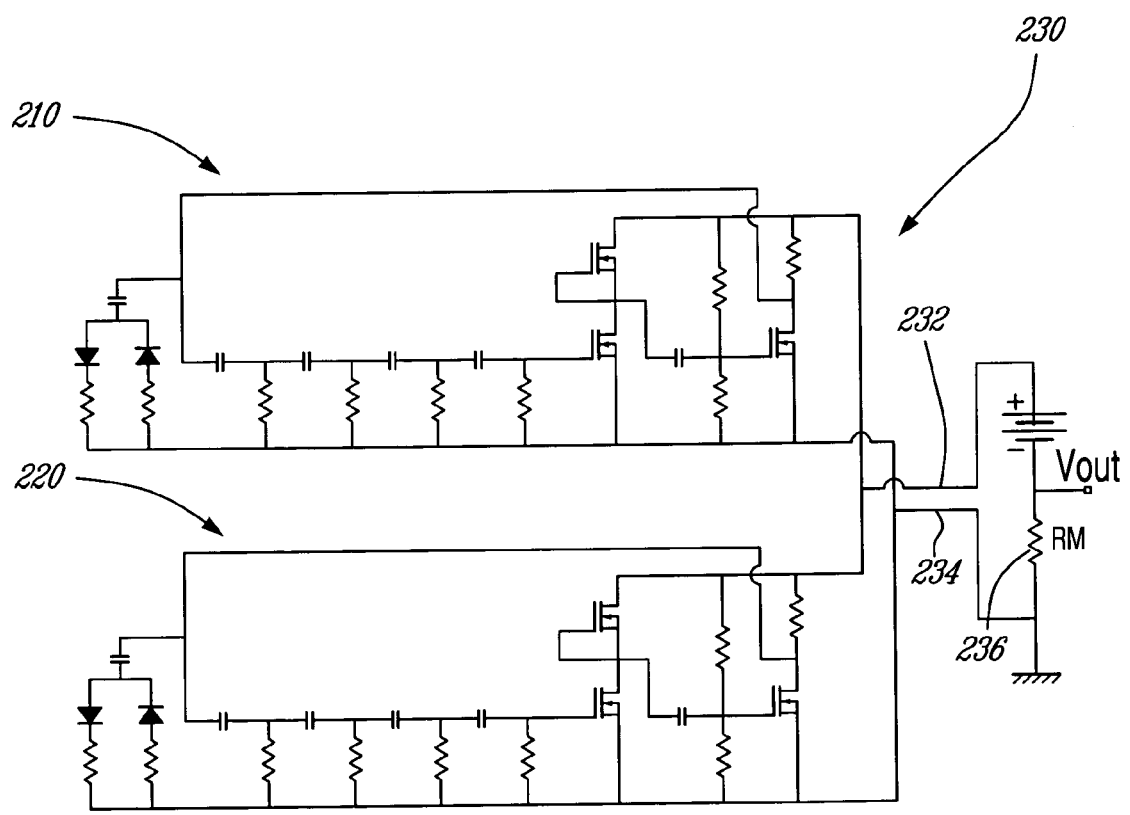
FIG. 6 represents the circuit of a parallel connection of two phase-shift oscillators for multiplexing.

As shown in FIG. 6, multiple phase-shift oscillators (only two shown) 210 and 220 may be connected in parallel, and consequently add their different current signals together. It is to be understood that the configuration of FIG. 6 with two oscillators is given as an example only and that the number of oscillators is not limited to two. The currents from the oscillators 210 and 220 of the sensor array 230 are all supplied through the same two wires 232 and 234, which carry the frequency content from all the oscillators 210, 220. Measuring the current through one of these two leads 232, 234 and performing a frequency analysis allows the recuperation of the oscillating frequency of all of the individual oscillators 210, 220 of the sensor array 230. The current may read, for example, by measuring the voltage drop across resistor RM 236.

Feedback Network

Since every elementary high-pass filter may provide a phase-shift between 0 and 90°, at least three of those filters are used in the feedback network 212 in order to reach the required 180° shift. The phase-shifts are additive, such that three filters will produce a 0 to 270° phase-shift, and four filters, a 0 to 360° phase-shift. The advantage of using four filters instead of three is to obtain lower total losses. Using more filters would lead to even lower losses, but would become more cumbersome in an integrated circuit, for a relatively negligible advantage in signal losses reduction.

Various means may be used to make the high-pass feedback network 212 components depend on the measured parameters. On the one hand, resistors 312, 322, 332 and 342 may be made of a temperature-dependent material, like platinum, for temperature sensing. They may also react to mechanical stresses, using the piezoresistance effect, and be embedded in membranes for pressure sensing. On the other hand, capacitances 314, 324, 334 and 344 are sensitive to the relative spacing of their electrodes, and hence may be made to vary with displacements of microstructures under accelerations. Those are only a few non-limiting examples of how a RC feedback network 212 may be designed to react to external stimuli.

Amplifier

Referring back to FIG. 5, the amplifier 214 of the phase-shift oscillator 210 provides a gain of at least 18.4, and a phase-shift of 180° at the oscillating frequency. Since any amplifier gain gets lower at higher temperatures, because of the reduction in transistor transconductance, excess gain is provided at room temperature. This way, the oscillator 210 may be operable in the harsh environment of a typical machine.

Either MOSFETs or Bipolar transistors may be used in high gain amplifiers. CMOS technology is also available with many types of semiconductors, so that n-channel and p-channel MOSFETs may both be used in the same integrated circuit. Several types of operational amplifiers may also be used to provide the required high gains.

The phase-shift oscillator 210 of FIG. 5 uses an amplifier 214 having an NMOS depletion load inverting high gain amplifier stage, followed by a PMOS non-inverting low gain output stage. This is only one example of an amplifier that may be used in the current application.

Wien Bridge Oscillator

Figure 7:
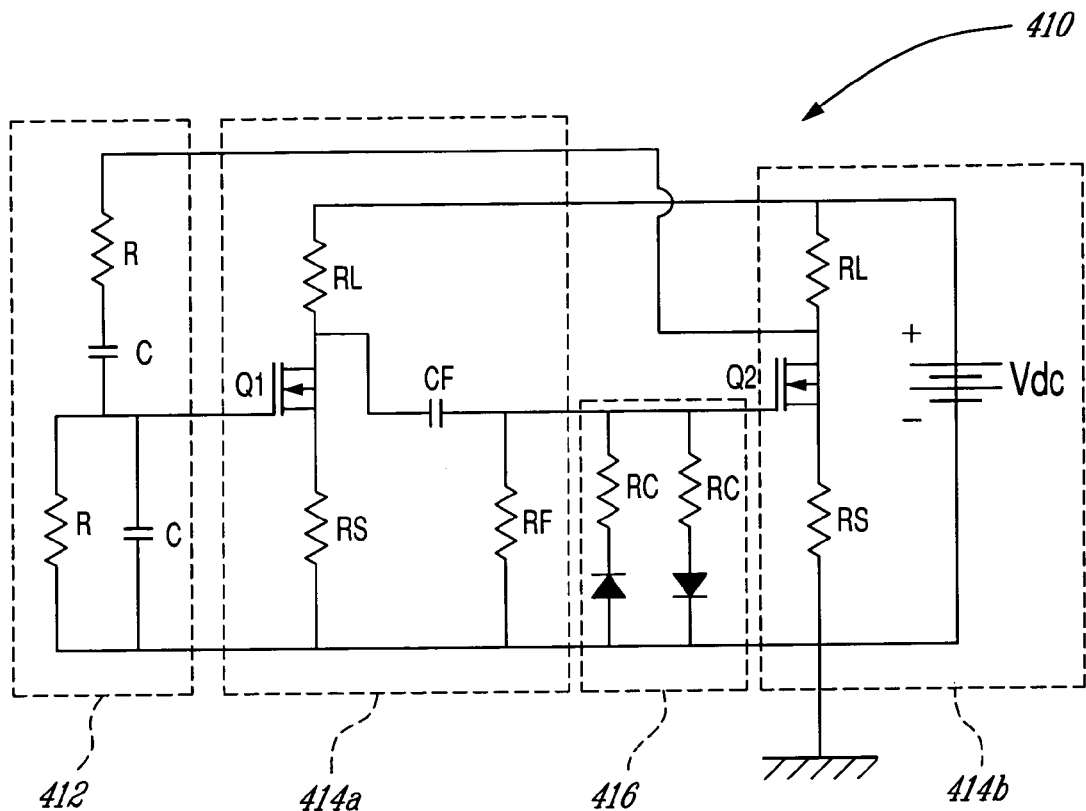
FIG. 7 illustrates the circuit of a Wien bridge oscillator.

A Wien bridge oscillator 410 is schematized in FIG. 7. It is composed of a Wien bridge 412, and two inverting amplifier stages 414a, 414b. At the oscillating frequency $f_o$, the Wien bridge 412 gives a gain of ⅓, and no phase-shift. Each amplifier stage 414a, 414b provides a 180° phase-shift, for a total phase-shift of 360° around the oscillator loop.

As a feedback network, the Wien bridge 412 has the advantage that the oscillator 410 needs relatively low gain amplifier stages 414a, 414b considering the low losses through the Wien bridge 412 at the oscillating frequency. A total gain of 3 needs to be provided by the two amplifier stages 414a, 414b. Secondly, parasitic oscillation modes that may appear due to undesired transistor behavior at high frequency are filtered out by the Wien bridge 412.

The Wien bridge oscillator 410 may be used as a back-up concept for the high gain amplifier 214 of the phase-shift oscillator 210 of FIG. 5. This new oscillator would use two low transconductance NMOS transistors 421 and 422 only, as shown in FIG. 7. The phase-shift oscillator 210 remains an advantageous concept because it provides a better quality of signal, and consequently ease frequency modulation.

Limiter

Figure 3:
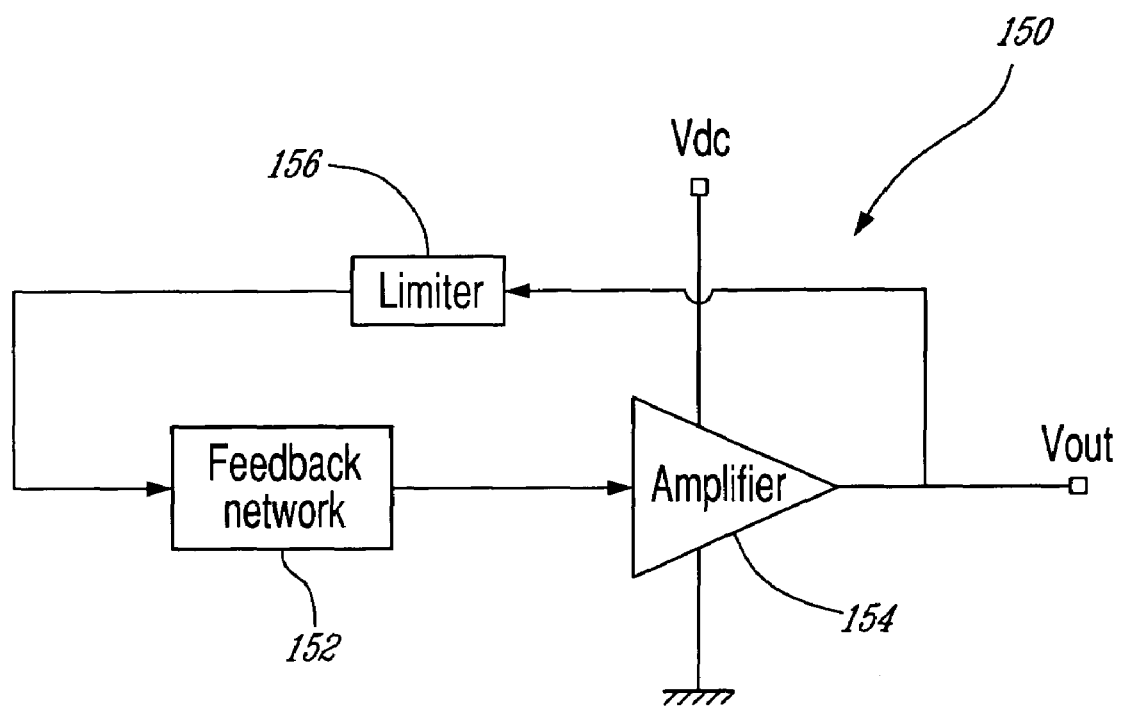
FIG. 3 is a schematic block diagram of the basic scheme of operation of a single oscillator.

In order to obtain a sinusoidal signal from any oscillator 150 of the general form shown FIG. 3, the amplifier 154 gain is set to reach a loop gain as close as possible to one. In the illustrative embodiment of the present invention, since the amplifier 154 gain is affected by temperature, it is difficult to maintain a loop gain of one in every machine operating condition unless some adjustments are continuously made to the amplifier 154 gain. Such adjustments being unpractical, a limiter 156 is used as a control feature, at the cost of slightly poorer signal quality. In most conditions, the amplifier 154 provides higher gain than really necessary, and the limiter 156 maintains the oscillator within stable operation.

Figure 8:
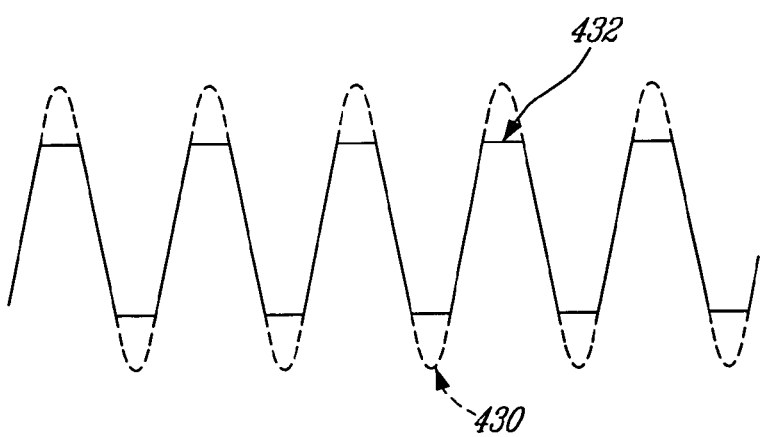
FIG. 8 represents a graph showing the characteristics of a diode signal clipper.
Figure 9:
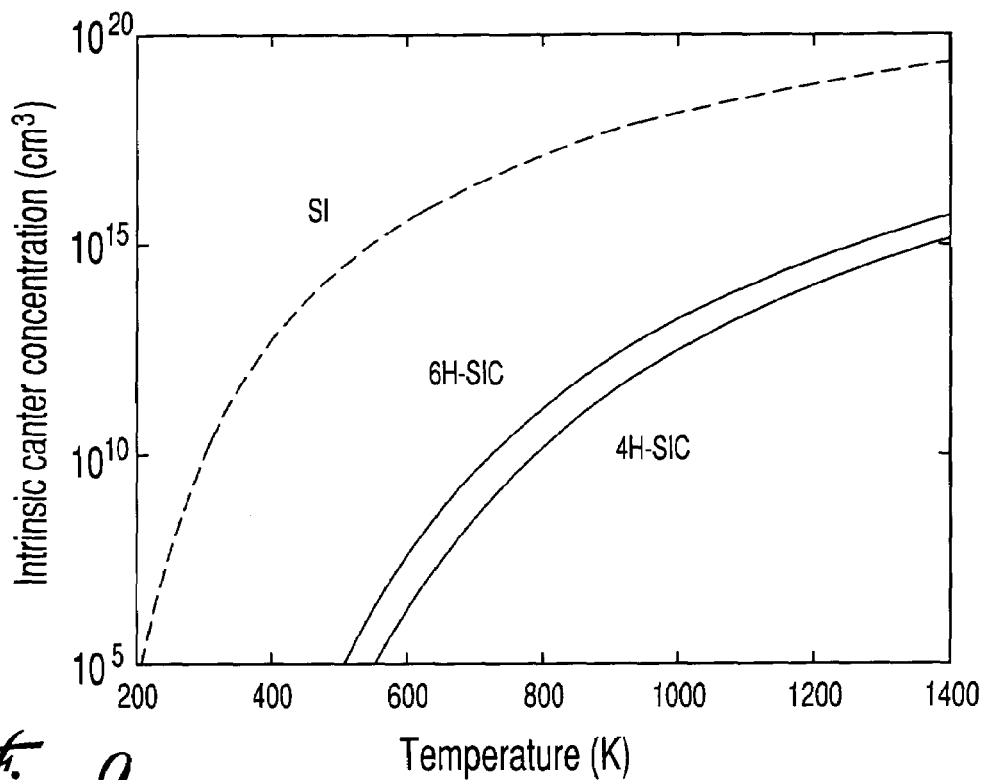
FIG. 9 is a graph showing intrinsic carrier concentration.

Returning to FIG. 7, in the Wien bridge oscillator 410, a diode clipper 416 is used as a limiter 216 to limit the oscillating voltage amplitude. The effect of the diode signal clipper 416 on the signal 430 is shown in FIG. 8, the signal 430 being clipped 432. Clipping a signal in this way adds up harmonic frequency components above the main signal 430. For effective frequency modulation, those components are filtered out as much as possible.

Referring back to FIG. 5, in the case of the phase-shift oscillator 210, the feedback network 212 produces considerable losses, which prevents harmonic components to survive near the main oscillating frequency. In the case of the Wien bridge oscillator 410 shown in FIG. 7, however, the feedback network 412 (i.e. the Wien bridge), gives only poor filtering close to the oscillating frequency, and the parasitic harmonic components are conserved throughout the oscillator loop. Thus, another type of limiter may be used with the Wien bridge oscillator 410, such as, for example, a non-linear heating element (or lamp), to limit the signal without affecting its shape. Such an element may be connected to limit the current through one of the amplifier lines, as its resistivity increases under heat generated by larger currents.

In order to get sinusoidal waveform generation without using a cumbersome nonlinear heating element, the phase-shift oscillator 210 is preferred. Nevertheless, the Wien bridge oscillator 410 using a diode clipper 416 as a limiter may be used to generate relatively clear sinusoidal waveforms. As mentioned previously, the Wien bridge oscillator 410 is a good back-up concept in situations where major problems are faced with the phase-shift oscillator 410.

Wide Band Gap Semiconductors

Since the oscillator 150 shown in FIG. 3 is designed to be installed inside a machine, any electronic component present in the feedback network 152, the amplifier 154 or the limiter 156 will be required to withstand the operating conditions of this machine. Amongst wide band gap semiconductors that are available for operation at high temperature, silicon carbide (SiC) and diamond represent good candidates.

Specific Example: Integrated Circuit Development

Figure 10:
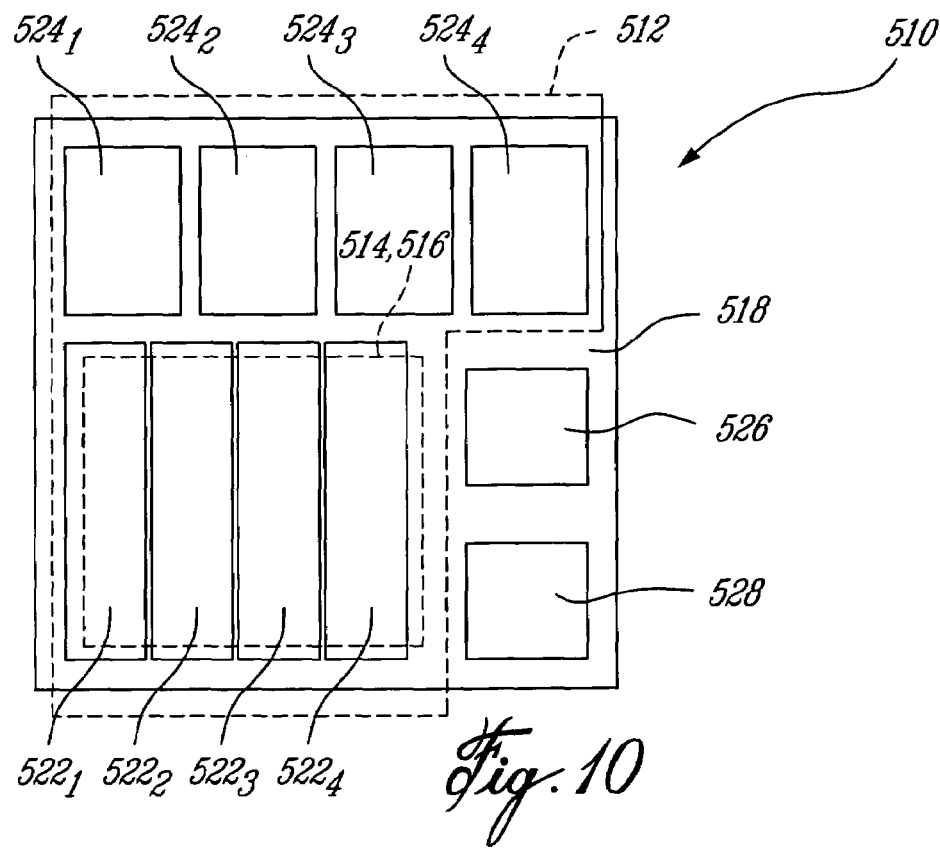
FIG. 10 represents the layout of a temperature sensitive integrated circuit phase-shift oscillator generating a 67 kHz signal at room temperature.

In order to obtain the full advantages of the sensitive wire 100 shown in FIG. 1, the feedback network 152, amplifier 154 and limiter 156 components of FIG. 3 need to be miniaturized into an integrated circuit such as, for example, the temperature sensitive integrated circuit phase-shift oscillator 510 shown in FIG. 10. It is to be noted that the oscillator 510 is an illustrative example only.

Feedback Network

As discussed previously, many types of feedback networks may be designed to be sensitive to many different machine parameters, such as, for example, temperature, pressure, strain, vibrations, airflows, etc. Referring to FIG. 10, The temperature sensitive integrated circuit phase-shift oscillator 510 will be described. The oscillator 510 includes a temperature sensitive feedback network 512 using platinum resistors $522_1$, $522_2$, $522_3$, $522_4$. It is the feedback network 212 of a phase-shift oscillator 210, as shown in FIG. 5, and it constitutes the basis of a temperature sensor array 230, shown in FIG. 4, that may be installed in an engine.

In such an integrated temperature sensitive feedback network 512, the platinum resistors $522_1$, $522_2$, $522_3$, $522_4$ and capacitors $524_1$, $524_2$, $524_3$, $524_4$ occupy a major portion of the substrate area 518 of the temperature sensitive integrated circuit phase-shift oscillator 510. As the frequency to be generated by the oscillator 510 is reduced, the size of the temperature sensitive feedback network 512 components increases. After doing trade-offs to minimize the size of the lowest frequency temperature sensitive feedback network 512, and fixing a limit to 1 mm², 60 kHz was found to be the lowest oscillating frequency at room temperature, with the phase-shift oscillator 210 concept. Resistors $522_1$, $522_2$, $522_3$, $522_4$ and capacitors $524_1$, $524_2$, $524_3$, $524_4$ of 200 pF and 10 kΩ, respectively, may be used in the temperature sensitive feedback network 512 to produce this frequency. Microfabrication limitations of the clean rooms are used to determine the smallest possible resistor cross section. Better resolution, and hence lower frequency, may be achieved in the future, using high resolution equipment. Lower oscillating frequency may also be achieved using the Wien bridge oscillator 410 concept.

Capacitors

Figure 11:
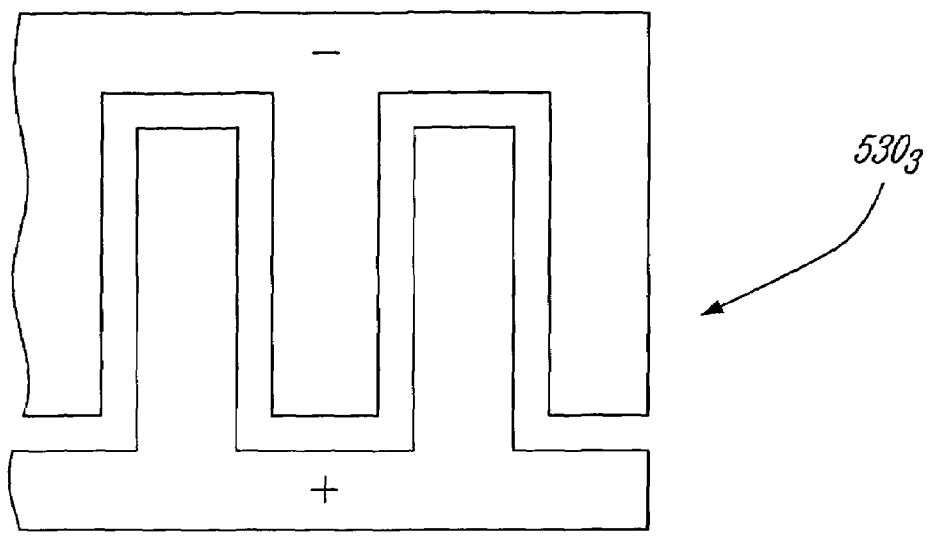
FIG. 11 represents an integrated circuit capacitor top view.
Figure 12:
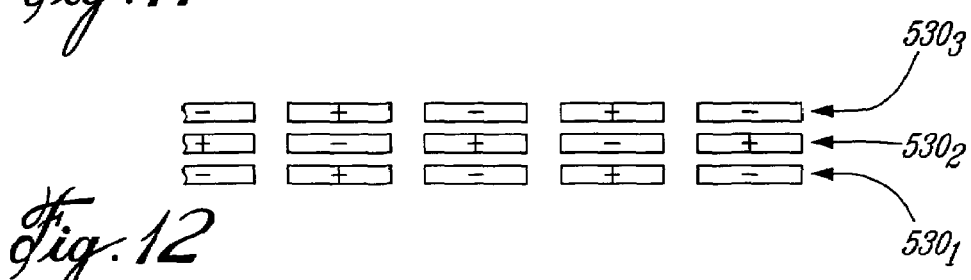
FIG. 12 represents an integrated circuit capacitor cross section.

The capacitors $524_1$, $524_2$, $524_3$, $524_4$ are composed of a stack of layers $530_1$, $530_2$, $530_3$ of conducting and dielectric materials, a top view of which is shown in FIG. 11 and a cross sectional view in FIG. 12. $SiO_2$ is used as the dielectric, whereas doped substrate SiC and polysilicon act as electrodes. Conventional flat plate capacitors do not offer a sufficiently high capacitance to substrate area ratio. In order to reach 200 pF with reasonable size capacitors, multiple layers of lateral flux capacitor geometries are microfabricated. A combination of lateral and transversal electric fields is used, in a configuration that may resemble the one illustrated in FIGS. 11 and 12. For the intent of the current implementation, a capacitance increase factor of five is targeted over the flat plate capacitor value. Hence, $$C = \frac{\varepsilon_0 \varepsilon_r A}{t_{diel}} \eta \qquad \text{Equation 1}$$

Where $\eta$ is the multiplying factor taken as equal to five;

$\varepsilon_0$ is the permittivity of free space;

$\varepsilon_r$, is the dielectric constant of $SiO_2$ (3.85);

A, is the covered substrate area; and $t_{diel}$, is the dielectric thickness between conducting layers.

With $\eta=5$ and $t_{diel}=50$ nm, a 200 pF square capacitor uses up 242×242 μm of substrate area. A slightly different aspect ratio is used in the layout of FIG. 10, with the same area. It is to be understood that the above described capacitor is given as an example only and that other equivalent capacitors may be used as well.

Platinum Resistors

Figure 13:
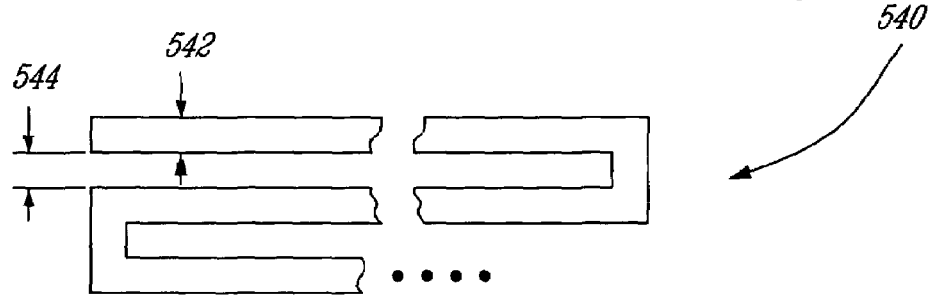
FIG. 13 represents an integrated circuit platinum resistor top view.
Figure 13:
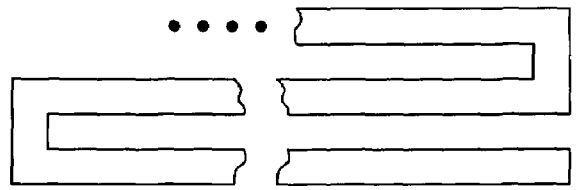

Considering the high electrical conductivity of platinum, each resistor $522_1$, $522_2$, $522_3$, $522_4$ of the temperature sensitive feedback network 512 takes the shape of a long serpentine wire 540 with a small cross section, as shown in FIG. 13. The resistance of this serpentine wire 540 is given by:

$$R = \frac{\rho p_t L}{A_{CS}} \qquad \text{Equation 2}$$

Where $\rho_{Pt}$ is the resistivity of pure platinum taken as $1.035 \times 10^{-7}$ Ω-m at 20° C.;

L, the total length of all serpentine wire 540 segments; and $A_{cs}$, the cross section area of the serpentine wire 540.

The deposition thickness is taken as 100 nm, and the lithography resolution, 2 μm. Both the width 542 of the serpentine wire 540 segments and the spacing 544 between them are chosen to be 2 μm, as shown in FIG. 13. For a square resistor of 10 kΩ, 278×278 μm of substrate area is used. To minimize the parasitic inductance of this stack of conducting serpentine wire 540 segments, the aspect ratio of the resistor is properly chosen. An aspect ratio of four was arbitrarily used in the layout of FIG. 10, i.e. resistors $522_1$, $522_2$, $522_3$, $522_4$.

In terms of microfabrication of the serpentine wire 540, platinum may be deposited using physical vapor deposition (PVD), over a $SiO_2$ insulating layer. Direct deposition over a SiC substrate could result in film degradation at temperatures above 500° C., due to formation of platinum silicides.

The power dissipated by each platinum resistor $522_1$, $522_2$, $522_3$, $522_4$ causes self-heating. The first resistor $522_1$ of the temperature sensitive feedback network 512 is the one that dissipates the most power. This resistor $522_1$ may reach power peaks of less than 100 μW. In the event that this resistor $512_1$ suffers from overheating, it may need to be made of wider platinum segments than the other resistors $522_2$, $522_3$, $522_4$. Any configuration using multiple resistance values for the four resistors $522_1$, $522_2$, $522_3$, $522_4$ may also be investigated in terms of heat transfer.

Amplifier and Limiter

Referring back to FIG. 10, the integrated circuit version of the amplifier 214 and limiter 216 of FIG. 3, amplifier 514 and limiter 516 respectively, use common technologies available in clean rooms, for example ion implantation, oxide growth, and deposition. Various materials may need to be used as MOSFET gate materials, to set threshold voltages to acceptable levels. Amplifier 514 and limiter 516 resistors may be doped directly into the semiconductor substrate 518, using ion implantation.

For the temperature sensitive integrated circuit phase-shift oscillator 510 of FIG. 10, the amplifier 514 and the limiter 516 are buried underneath the platinum resistors $522_1$, $522_2$, $522_3$, $522_4$, to save on substrate 518 space. This may be done readily by depositing and polishing an oxide layer onto the semiconductor components, before depositing the platinum resistors $522_1$, $522_2$, $522_3$, $522_4$.

Contacts

Electrical connections are made on a separate deposition layer, over an oxide layer. Electronic components are reached through via holes, using conventional etching technology. Ohmic contacts 526, 528 may be made using materials recommended in the published literature.

Integration and Packaging

As illustrated in FIG. 1, the resulting temperature sensitive integrated circuit phase-shift oscillator array resembles a sensitive wire 100, with sensors $102_1$ to $102_{10}$. Along the same two leads 122 and 124, 10 temperature sensitive integrated circuit phase-shift oscillators 510 (sensors $102_1$ to $102_{10}$) are connected through their Ohmic contacts 526, 528. The leads 122 and 124, and the sensor $102_1$ to $102_{10}$ circuits may all be protected using an insulating material, like flexible ceramic or polymer sheath, or rigid cement, depending on the application. The resulting sensor array 100 is bonded to any substrate material using common sensor bonding methods.

Array Design

Referring back again to FIG. 10, by understanding the behavior of the temperature sensitive feedback network 512, it is possible to determine the calibration curve (frequency vs measured parameter) of the temperature sensitive integrated circuit phase-shift oscillator 510, and hence to appreciate its performance. In order to ease frequency modulation, the designer of a sensor array 100 may want to make sure that every oscillator 510 keeps its signal within a dedicated frequency band, in all operating conditions.

The example of a platinum resistor temperature sensor is used again here to explain how to organize the multiple frequency bands of a complete sensor array 100, using this approach of isolated frequency bands. From experiments, in the range of 0 to 850° C., the resistance of a platinum resistor is given by:

$$R = R_0(1 + AT + BT^2) \quad \text{Equation 3}$$

Where $A = 3.9083 \times 10^{-3}$ °C.$^{-1}$; and $B = -5.775 \times 10^{-7}$ °C.$^{-2}$ [11].

$R_0$ is the resistance at a reference temperature $T_0$ of 0° C. This relation may be approximated by:

$$R \approx R_0[1 + \alpha(T - T_0)] \quad \text{Equation 4}$$

Where

α is the average temperature coefficient, which depends on reference $T_0$ and on the temperature range to be covered.

Each electronic oscillator of a sensing array covers a dedicated frequency range, for example the sensor array 100 shown in FIG. 1 covers the frequency range 110 starting at frequency $112_1$ and ending at frequency $112_{10}$, as illustrated in FIG. 2. Within this range, each sensor $102_1$ to $102_{10}$ has a design frequency $f_d$, at a design temperature $T_d$. Referring back to FIG. 5, in the phase-shift oscillator 210 concept selected here, the oscillating frequency is inversely proportional to R. Hence, for each sensor $102_1$ to $102_{10}$:

$$\frac{f}{f_d} = \frac{R_d}{R} \approx \frac{R_0[1 + \alpha(T_d - T_0)]}{R_0[1 + \alpha(T - T_0)]} \quad \text{Equation 5}$$

leading to:

$$f = f_d \frac{1 + \alpha(T_d - T_0)}{1 + \alpha(T - T_0)} \quad \text{Equation 6}$$

One way of spacing the sensors $102_1$ to $102_{10}$ in the frequency domain is to make consecutive sensors, for example sensors $102_1$ and $102_2$, to have coincident oscillating frequencies when reaching corresponding opposite temperature limits. Mathematically, if every sensor $102_1$ to $102_{10}$ has the same design temperature $T_d$, and the same operating range $\Delta T_{range}$, this may be expressed by:

$$f_i\left(T_d + \frac{\Delta T_{range}}{2}\right) = f_{i-1}\left(T_d - \frac{\Delta T_{range}}{2}\right) \quad \text{Equation 7}$$

Using Equation 6, it follows that the ratio of two consecutive design frequencies may be chosen from:

$$\frac{f_{di}}{f_{di-1}} = r = \frac{1 + \alpha\left(T_d + \frac{\Delta T_{range}}{2} - T_0\right)}{1 + \alpha\left(T_d - \frac{\Delta T_{range}}{2} - T_0\right)} \quad \text{Equation 8}$$

The design frequencies then obey a geometric series of ratio r, such that:

$$f_{di} = f_{d1} \cdot r^{j-1} \quad \text{Equation 9}$$

As a consequence, if $f_{d\ max}$ is the maximum possible frequency that may be generated, the number n of measuring points that may be integrated to a sensor array 100 satisfies the following relation:

$$n < \frac{\ln\left(\frac{f_{d\max}}{f_{d1}}\right)}{\ln r} + 1 \quad \text{Equation 10}$$

Figure 14:
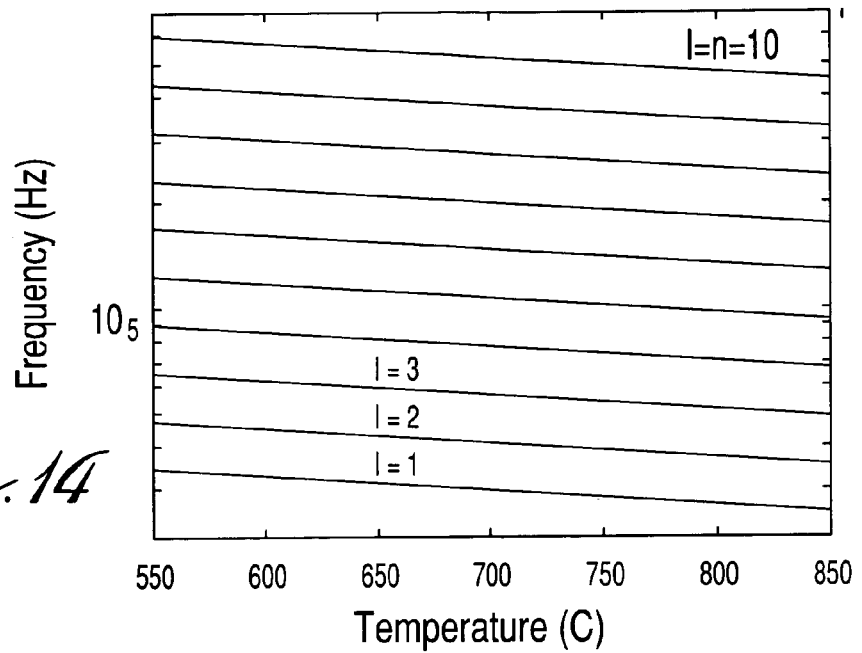
FIG. 14 is a graph showing calibration curves of the sensitive wire of FIG. 1 used as a platinum resistance temperature sensor.

The sensor array 100 of FIG. 1 may be designed using this methodology, with $T_d$=700° C., $\Delta T_{range}$=300° C., $f_{d1}$=30 kHz, $f_{d\ max}$=600 kHz, and $\alpha$=3.85×10$^{-3}$/° C. The resulting theoretical response curves are graphed in FIG. 14. Once again, within the range of operation of the sensor array 100, each oscillator 210 maintains itself within its dedicated frequency band.

As mentioned previously, another valuable approach would be to allow frequency bands to overlap each other, and to use temporal signal evolution, or any other suitable methods, to distinguish measurements from one another. More numerous sensors could be integrated in a single array by using this second approach.

To appreciate the sensitivity of the sensor array 100, Equation 6 needs to be differentiated with respect to T:

$$\frac{df}{dT} = \frac{-\alpha f}{1 + \alpha(T - T_0)} \quad \text{Equation 11}$$

The ratio of the relative frequency variation to the temperature variation is then given by:

$$\frac{\Delta f}{f \Delta T} = \frac{-\alpha}{1 + \alpha(T - T_0)} \quad \text{Equation 12}$$

This ratio depends only on the measured temperature, and is identical for every sensor $102_1$ to $102_{10}$ of the sensor array 100. As examples, at 400 and 800° C., it is equal to −0.1 and −0.15%/° C., respectively.

The resolution of the sensor array 100 is in part limited by the resolution of the frequency measuring system. Fundamentally, to improve this resolution, the acquisition time is increased. The widths of the peaks, in the frequency domain, get narrower as the frequency analysis is performed over a longer time interval. Tests conducted regarding the effect of signal duration over frequency peak have suggested that if the FFT is conducted over 200 periods, a frequency resolution better than 1% may be expected. For a sensor array 100 operating at 800° C., this would mean a temperature resolution of less than 6.67° C. This would satisfy the basic requirements of a gas turbine temperature sensor.

EXAMPLE

Figure 15:
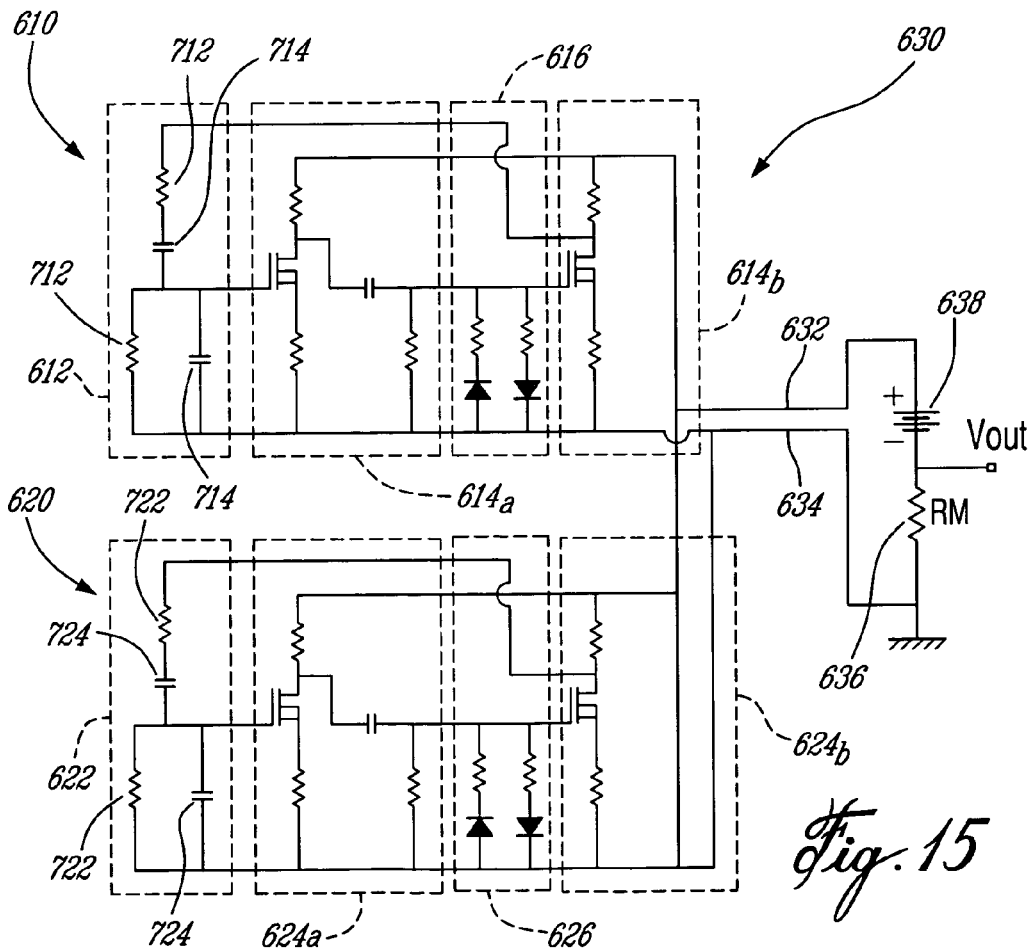
FIG. 15 represents the circuit of a parallel connection of two Wien bridge oscillators for multiplexing.

Referring to FIG. 15, as a practical example of a sensor array 630 according to the illustrative embodiment of the present invention, in which two high temperature macroscopic oscillators 610 and 620 are connected so as to provide a multiplexed signal. The oscillators 610, 620 were built and operated in a high temperature environment, and as such high temperature discrete components were assembled on two separate ceramic substrates. The circuits were made to be sensitive to temperature, using platinum resistors in the feedback networks 612, 622.

RF high power SiC MESFETs from Cree Inc. were used for amplifying. Those transistors providing relatively low transconductance at low power, the Wien bridge configuration 410, presented in FIG. 7, was selected for the oscillators 610, 620, because it allows for low gain amplifier stages. For oscillator 610, the Wien bridge feedback network 612 uses 1500 Ω resistors 712 (actually a 1000 Ω and a 500 Ω connected in series) and 600 pF capacitances 714, giving the oscillator an oscillating frequency of 215 kHz. As for the oscillator 620, the Wien bridge feedback network 622 uses 1000Ω resistors 722 and 600 pF capacitances 724, giving the oscillator an oscillating frequency of 258 kHz. It is to be understood that the stated oscillation frequencies are at room temperature. The discrete components were chosen or designed based on their resistance to high temperature, and are listed in Table 1, using the identification symbols of FIG. 7.

TABLE 1

List of oscillator discrete components

| Component | Symbol | Supplier | Part number or description | Value |
|---|---|---|---|---|
| Wien bridge components | R | Omega | A2132 | 500 Ω |
|  | C | — | A2142 Handmade, 20 mm × 20 mm stacking of 5 0.004" thick Pyrex ® sheets with 6 .062" thick copper sheets | 1000 Ω 600 pF |
| Transistors | Q1, Q2 | Cree | CRF-22010-101 or CRF-24010-101 MESFET | — |
| Amplifier resistors | RL | Vishay Dale | CL-4125DA | 800 Ω |
|  | RS | Vishay Dale | CL-4125DA | 150 Ω |
| Coupling filter components | CF | — | Same as Wien bridge capacitor | 600 pF |
|  | RF | Huntington Electric | ALSR-5 | 25 kΩ |
| Limiter resistors | RC | Huntington Electric | ALSR-1 | 20 Ω |
| Diodes | — | Cree | CSD01060A | — |
| Wire | — | — | Steel AWG 21 | — |
| Wire sheathing | — | Omega | XC4-116 (Nextel 440) | — |
| Connections | — | — | Steel fasteners, aluminum terminals | — |
| Substrate | — | McMaster-Carr | 8489K54 (Macor) | — |
| Power supply | Vdc | — | — | 80 V |

Figure 16:
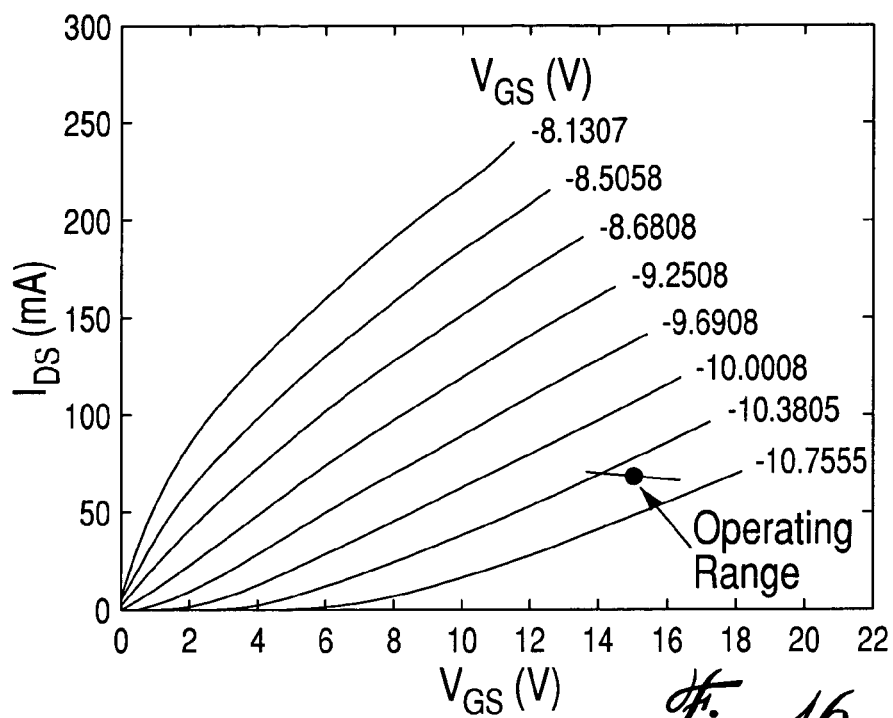
FIG. 16 is a graph showing the operation of a transistor Q1 in the macroscopic high temperature Wien bridge oscillator of FIG. 7, at room temperature.

The basic amplifier stage 614a, 624a used in both circuits 610, 620, respectively, was numerically designed using the I-V characteristics of the SiC transistor. In order to minimize the operating voltages, the dissipated power, and hence heating of the components, the Cree transistor was used in the triode region, very close to the threshold voltage. FIG. 16 shows the operating point of transistor Q1 over the corresponding I-V curves. A standard curve tracer was used to measure the transistor characteristics at room temperature. Parametric analysis was performed by varying the values of amplifier resistors RS and RL, in order to find an acceptable amplifier design.

Figure 17A:
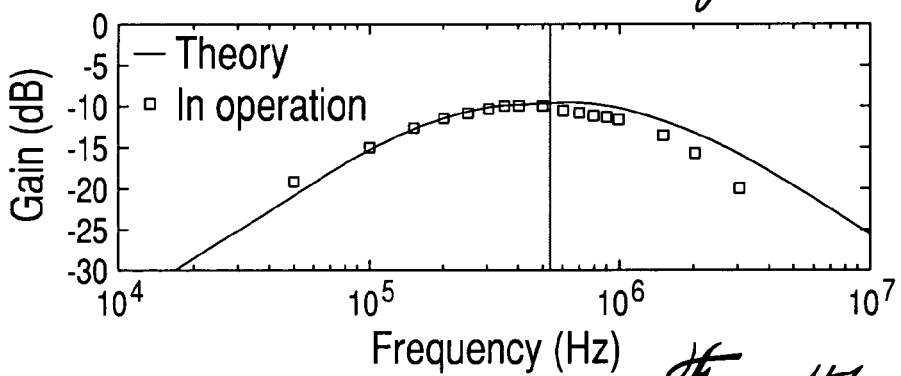
FIG. 17 is a bode plot of a macroscopic high temperature Wien bridge oscillator prototype, at room temperature, using handmade 600 pF capacitors, and 500 Ω resistors.
Figure 17B:
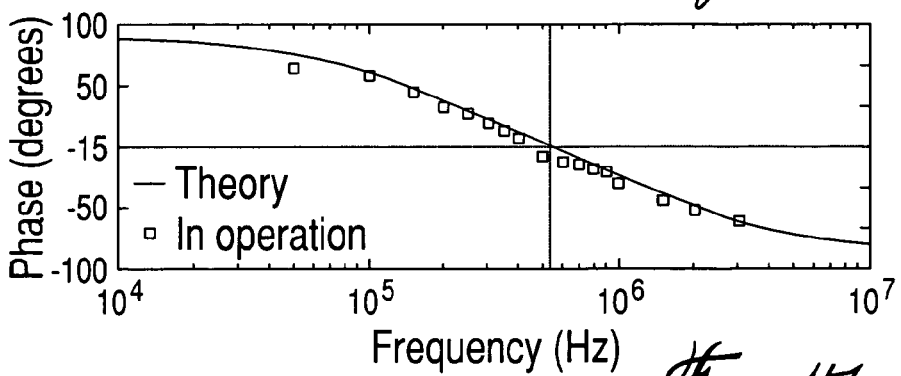

The handmade 600 pF pyrex-copper capacitors 714, 724 demonstrated sufficiently good behavior to keep bridge losses to an acceptable level at the operating frequencies. FIG. 17 shows the Bode plot of a Wien bridge using those capacitors with 500 Ω resistors. Experimental points illustrate that the resulting losses compare well with theoretical calculations.

Figure 18:
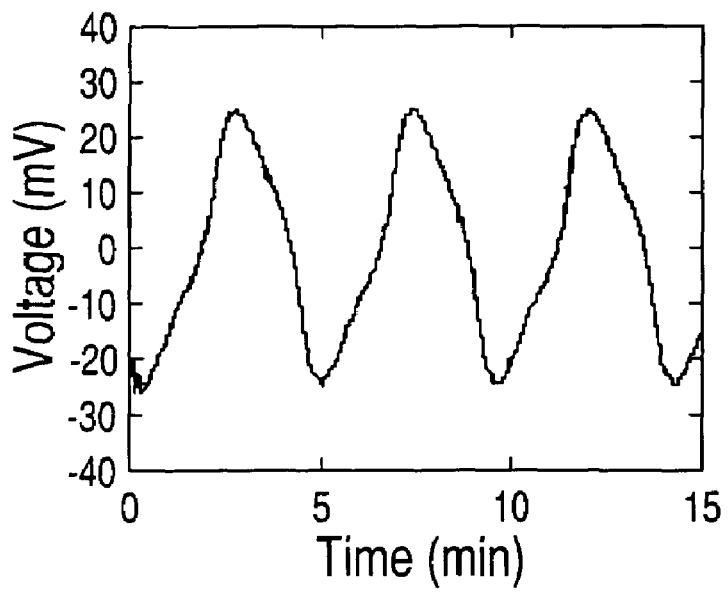
FIG. 18 illustrates the waveform of a first macroscopic high temperature oscillator prototype, measured at room temperature.
Figure 19:
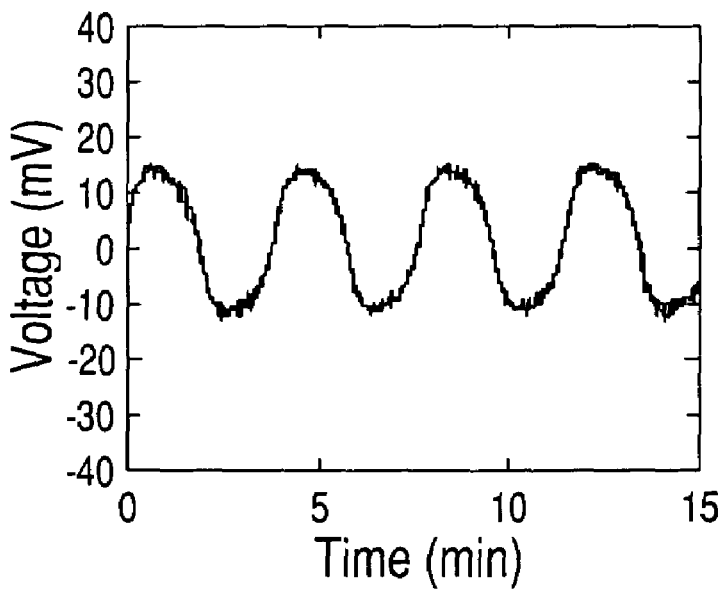
FIG. 19 illustrates the waveform of a second macroscopic high temperature oscillator prototype, measured at room temperature.
Figure 20:
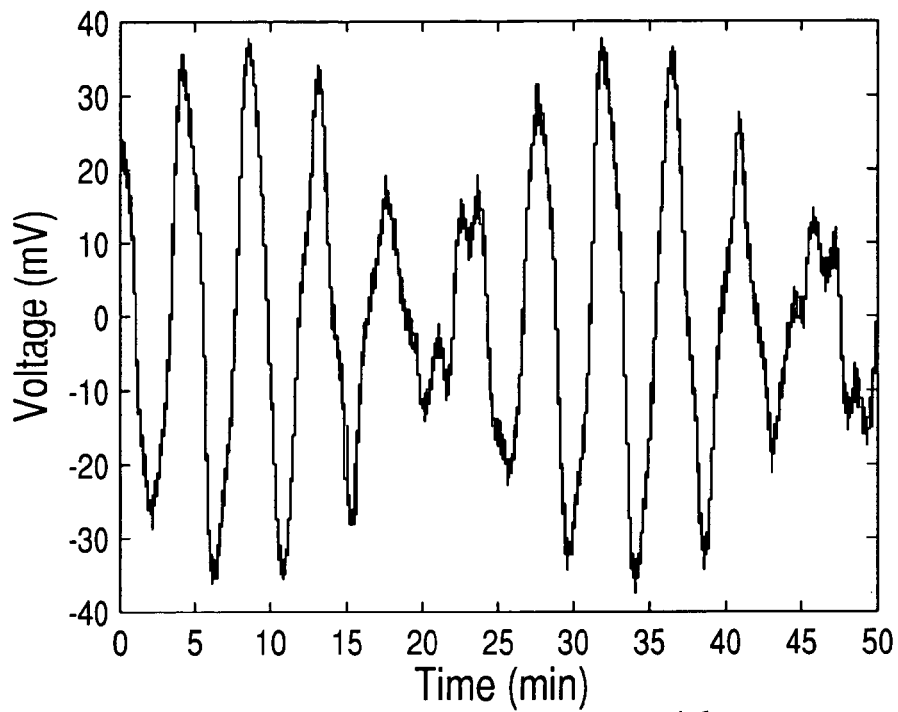
FIG. 20 illustrates the waveform of the multiplexed waveforms of FIGS. 18 and 19.

The room temperature signals of the two individual oscillators 610 and 620, as well as their multiplexed signal, are plotted in FIGS. 18, 19 and 20, respectively. A resistor RM 636 of 20 Ω was used to measure the current going through the leads 632 and 634 carrying the total current from the oscillators 610, 620, while the individual oscillator 610, 620 currents were obtained by feeding one oscillator at a time. The resistor RM 636 was connected in the 80 V power supply line 638, to limit its influence on the behavior of the oscillators 610, 620.

The shapes and amplitudes of the two individual signals may be understood by looking closely at the operation of the amplifiers 614a, 614b, 624a, 624b. For each oscillator 610, 620, two inverting amplifier stages 614a, 624a and 614b, 624b are fed with the same current carrying line. The behavior of those two amplifier stages are quite different, in terms of alternating signal. The alternating currents withdrawn by each of them are different in magnitude and phase, and add up together to compose the measured signal. The fact that the signal shows unsymmetrical waves (about the y-axis) suggests that the two currents do not have a phase difference of exactly 180°, as expected from theory. Furthermore, the current going through the second amplifier stage 614a, 624a strongly depends on the Wien bridge input impedance, which explains why the two oscillators 610, 620 show different output waveforms. Oscillator 610 uses a higher impedance bridge, which causes the gain of the second stage to be higher. Hence, the alternating current withdrawn by the second stage is more prominent in the case of oscillator 610. This also explains why oscillator 610 produces a higher amplitude signal than oscillator 620, even if the two oscillators 610, 620 use identical diode limiters 616, 626.

In the present concept, the sensor array 630 may be fed with DC voltage only intermittently, depending on the desired temperature measurement frequency. This minimizes power consumption and overheating due to electric power dissipation. At every reading, real-time frequency analysis is performed, using a fast fourier transform (FFT) algorithm, and frequency peaks are detected and recorded. Data acquisition is done over 200 periods of the lowest frequency signal of the sensor array 630, to ensure acceptable sensor sensitivity. The acquisition sampling frequency corresponds to twice the frequency of the highest frequency signal, to satisfy the Nyquist theorem. Using a dedicated FFT and peak detection processor, a 1 Hz temperature measurement frequency may be achievable.

The measuring sequence is described in Table 2, for a measurement frequency of one measurement per 15 s.

TABLE 2

Measuring sequence

| Time (s) | Operation |
|---|---|
| 0 | Power on |
| 0.1 | Data acquisition over $\Delta t_{da}$ |
| 0.1 + $\Delta t_{da}$ | Power off |
| | Frequency analysis |
| | Peak detection |
| | Data display and storage |
| 15 | Power on |
| | Beginning of another sequence |

Figure 21:
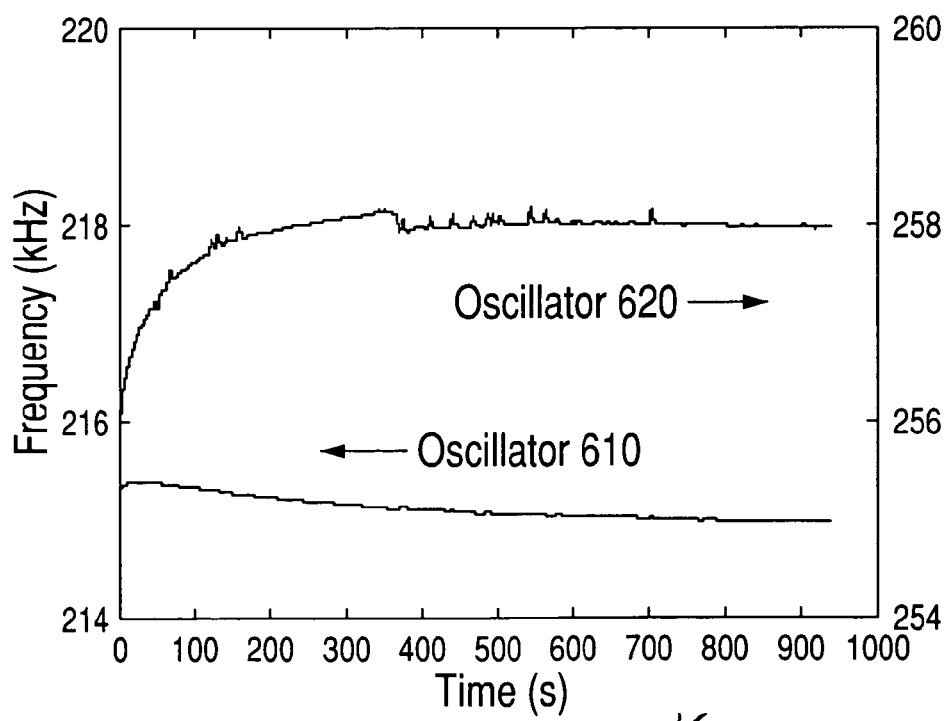
FIG. 21 is a graph illustrating a frequency drift of two multiplexed macroscopic high temperature oscillator prototypes at room temperature.

The following results were obtained using the measuring sequence just presented. FIG. 21 shows how the frequencies of the two multiplexed oscillators 610, 620 drift in time before stabilizing after about ten minutes. On the one hand, the drift of oscillator 610 may readily be explained by the thermal inertia of the platinum resistors 712, 722. Those resistors 712, 722 are self-heating before reaching an equilibrium average temperature and hence an average equilibrium resistance. This causes the frequency to decrease asymptotically. On the other hand, the drift of oscillator 620 may be due to progressive accumulation of charges in parasitic capacitances, for example. In both cases, this initial frequency drift stays within 0.8% of the stabilized frequency.

Figure 22:
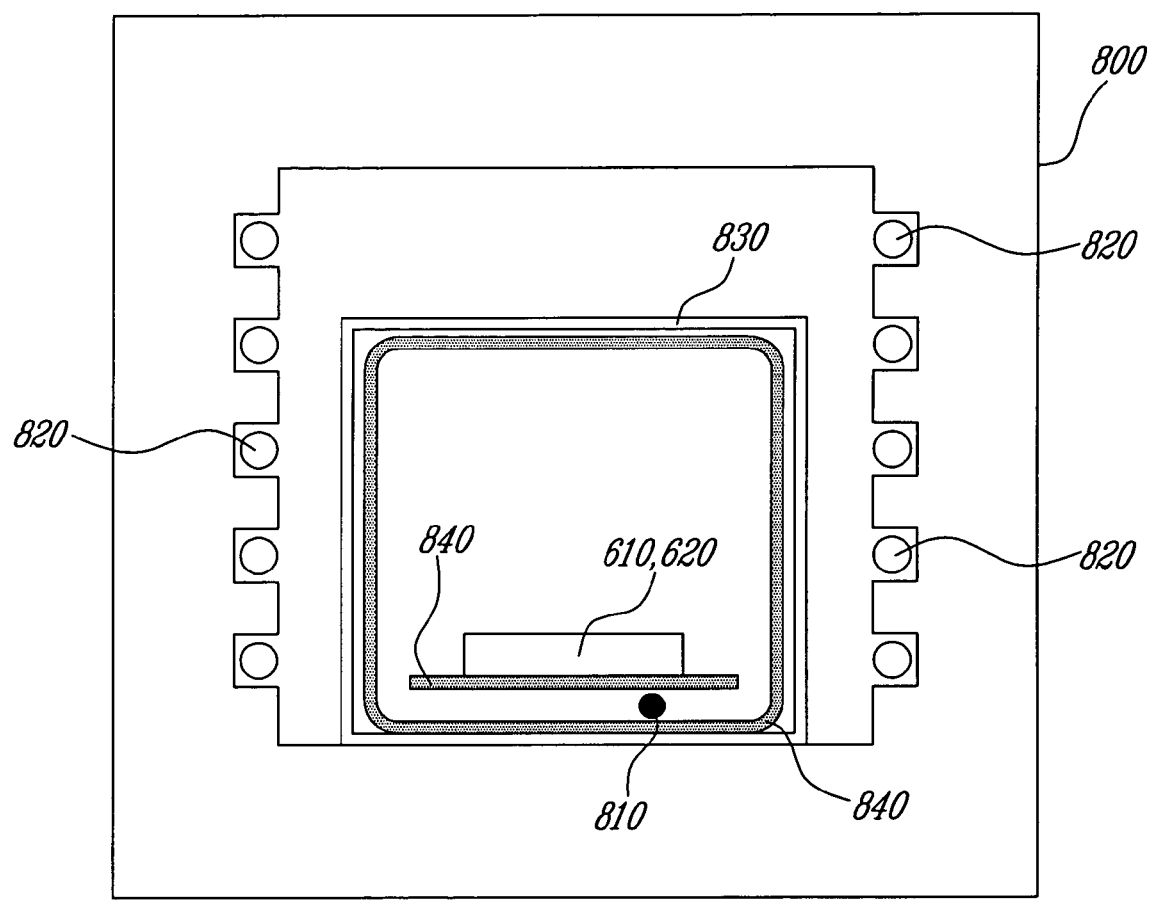
FIG. 22 is an elevational view of an oven setup for high temperature macroscopic testing.

Referring to FIG. 22, the two oscillators 610, 620 were operated in an oven 800 up to a temperature of 180° C. Temperature was monitored inside the oven 800 using a standard thermocouple 810 located under the oscillators 610, 620. In order to avoid direct radiation from the resistive heating elements 820 onto the circuit components of the oscillators 610, 620, a steel case 830 was used as a shield. The thermocouple 810 and the oscillators 610, 620 were all placed inside the steel shield 830, and are assumed to have been kept within the same ambient temperature. Fiberglass 840 was used for electrical insulation only. Temperature was increased and decreased at a maximum rate of 2° C./min, which is believed to be slow enough to ensure a good synchronization between oscillator 610, 620 temperature evolution and thermocouple 810 reading. Quasi-static conditions were maintained throughout all operations.

Figure 23:
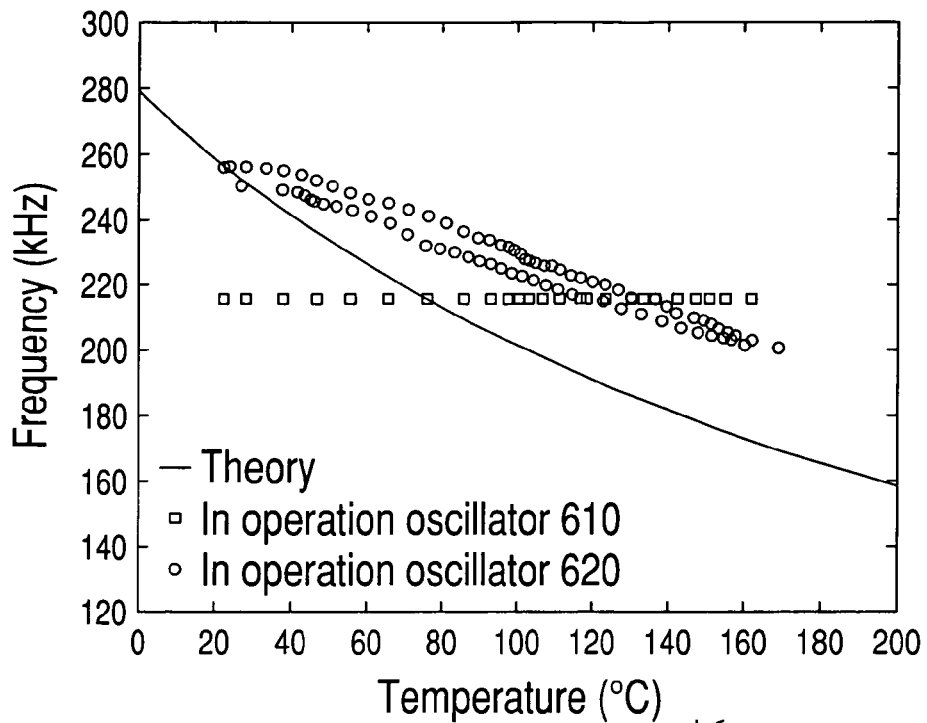
FIG. 23 is a graph illustrating the behavior of macroscopic high temperature oscillator prototypes when heated up and cooled down in an oven, wherein two oscillators were multiplexed by current addition but only one of the oscillator was heated up in the oven.

FIG. 23 shows the temperature response of oscillator 620 when it was operated for the first time. During this first operation, the signals of the two oscillators 610, 620 were multiplexed, but only oscillator 620 was placed in the oven 800 and heated up. The results demonstrate that oscillator 610 was not influenced by the frequency variations of oscillator 620. The two frequency signals were independent, as expected.

Hysteresis was observed when oscillator 610 was cooled down back to room temperature. This is not believed to be due to thermal inertia of the oscillator 610 circuit, considering the quasistatic character of the operation, but rather to some permanent modifications of electrical properties. Oscillator 610 did not recover its exact original oscillating frequency, even after 12 hours of rest at room temperature. It drifted from 256.1 kHz at the beginning of the operation to 250.5 kHz at the end of the operation, for a 2% reduction in frequency.

Figure 24:
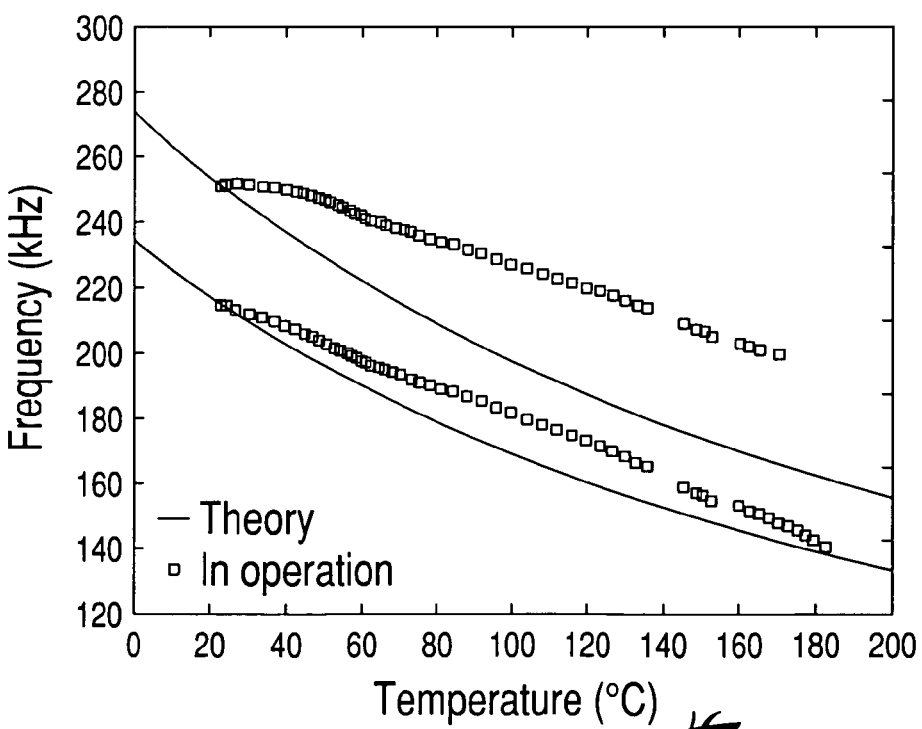
FIG. 24 is a graph showing the behavior of two multiplexed macroscopic high temperature oscillator prototypes when heated up in an oven.

FIG. 24 shows the results of another operation where the two oscillators 610, 620 were both placed in the oven 800 and heated up. Oscillator 610 demonstrated a behavior that is closer to the theoretical curve than oscillator 620. During this second operation, oscillator 620 experienced a negligible permanent change in room temperature frequency, from 250.5 kHz at the beginning of the operation to 250.4 kHz at the end of the operation. This suggests that, after a first stabilization anneal of an oscillator, hysteresis is reduced, and results may be repeatable.

During this second operation, above 170° C., oscillator 620 stopped oscillating, whereas oscillator 610 oscillated up to about 184° C. Above those limits, transistor transconductance is too low, and the total loop gain is smaller than unity, preventing oscillation. When the two oscillators 610, 620 were cooled down, oscillating signals came back.

Other Applications

Although high temperature applications have been discussed, low temperature applications are not excluded. The conventional silicon semiconductor technology may readily be used to build a low temperature sensor array along the principle of the present invention, for applications in biotechnological machines, for instance.

Fundamentally, any low access component operating in the high temperature environment of a machine, and necessitating monitoring of distributions of various parameters, like material temperature, fluid temperature, fluid pressure and flow, or material strain, represents one possible application of the present invention. Such applications may be found in commercial or experimental products as well as in experimental equipment.

Although the present invention has been described by way of particular embodiments and examples thereof, it should be noted that it will be apparent to persons skilled in the art that modifications may be applied to the present particular embodiment without departing from the scope of the present invention.

What is claimed is:

1. A sensor, for measuring a parameter in a machine environment, the sensor comprising:
   a feedback network having a frequency response which varies with the parameter to be measured;
   an amplifier in cooperation with the feedback network to generate a signal that alternates at a frequency corresponding to the frequency response of the feedback network, the amplifier and the feedback network being interconnected in a loop; and
   an output.

2. A sensor according to claim 1, wherein the sensor is energized only intermittently.

3. A sensor according to claim 1, wherein the sensor further comprises a limiter so configured as to limit the signal within a predetermined amplitude range.

4. A sensor according to claim 3, wherein the limiter is a mechanical device.

5. A sensor according to claim 4, wherein the mechanical device is a stopper.

6. A sensor according to claim 3, wherein the limiter is an electrical device.

7. A sensor according to claim 6, wherein the electrical device is a diode clipper.

8. A sensor according to claim 6, wherein the electrical device is a non-linear heating element.

9. A sensor according to claim 1, wherein the sensor includes a phase-shift oscillator.

10. A sensor according to claim 1, wherein the feedback network includes a Wien bridge oscillator.

11. A sensor according to claim 1, wherein the feedback network is one of a vibrating beam, a quartz piezoelectric crystal and an electronic circuit.

12. A sensor according to claim 1, wherein the feedback network is a mechanical device.

13. A sensor according to claim 1, wherein the feedback network is an RC electronic circuit.

14. A sensor according to claim 1, wherein the parameter is one of a temperature, a pressure, a strain and a flow.

15. A sensor according to claim 1, wherein the amplifier comprises an NMOS depletion load inverting high gain amplifier stage followed by a PMOS non-inverting low gain output stage.

16. A sensor according to claim 1, wherein the signal from the sensor is generally sinusoidal in form.

17. A sensor according to claim 1, wherein the feedback network includes at least three high-pass filters.

18. A sensor according to claim 17, wherein the feedback network includes four high-pass filters.

19. A sensor according to claim 1, wherein the sensor is energized only intermittently.

20. A sensor according to claim 1, wherein the output is defined by a power input.

21. A sensor according to claim 1, wherein the sensor comprises wiring means connected to a power supply and through which a current is supplied to the amplifier and wherein the output of said sensor comprises said wiring means.

22. A sensor according to claim 21, wherein said wiring means comprises a single pair of wires.

23. A sensor array for simultaneously measuring various parameters in a machine environment, the sensor array comprising:
   a plurality of sensors, each sensor producing a signal having a frequency which varies with the parameter to be measured by that sensor; and
   a common output connected to the plurality of sensors, wherein the signals from each of the plurality of sensors are multiplexed onto the common output so as to be available simultaneously.

24. A sensor array according to claim 23, wherein the various parameters are selected from a group consisting of temperatures, pressures, strains, flows or a combination thereof.

25. A sensor array according to claim 23, wherein the signals from each of the plurality of sensors are multiplexed onto the output using one of amplitude modulation, frequency modulation or digital multiplexing.

26. A sensor array according to claim 23, wherein each of the frequencies of the plurality of sensors belong to exclusive frequency bands.

27. A sensor array according to claim 23, wherein each of the frequencies of the plurality of sensors belong to overlapping frequency bands.

28. A sensor array according to claim 23, wherein the signals from the plurality of sensors are generally sinusoidal in form.

29. A sensor array according to claim 23, wherein the plurality of sensors are energized only intermittently.

30. A sensor array according to claim 23, wherein the common output of the sensor array is defined by a power input common to the plurality of sensors.

31. A sensor array according to claim 23, wherein the sensor array comprises wiring means connected to a power supply and through which a current is supplied to the plurality of sensors and wherein the common output of said sensor array comprises said wiring means.

32. A sensor array according to claim 31, wherein said wiring means comprises a single pair of wires.

33. A sensor array for simultaneously measuring various parameters in a machine environment, the sensor array comprising:

a plurality of oscillators, each of the oscillators including;
  a feedback network having a frequency response which varies with the parameter to be measured by that oscillator; and
  an amplifier in cooperation with the feedback network to generate a signal that alternates at a frequency corresponding to the frequency response of the feedback network, the amplifier and the feedback network being interconnected in a loop; and
a common output connected to the plurality of oscillators, wherein the signals from each of the plurality of oscillators are multiplexed onto the output so as to be available simultaneously.

34. A sensor array according to claim 33, wherein the each of the oscillators further include a limiter so configured as to limit the signal within a predetermined amplitude range.

35. A sensor array according to claim 34, wherein the limiter is a mechanical device.

36. A sensor array according to claim 35, wherein the mechanical device is a stopper.

37. A sensor array according to claim 34, wherein the limiter is an electrical device.

38. A sensor array according to claim 37, wherein the electrical device is a diode clipper.

39. A sensor array according to claim 37, wherein the electrical device is a non-linear beating element.

40. A sensor array according to claim 33, wherein the sensor array is in the form of a wire.

41. A sensor array according to claim 33, wherein the plurality of oscillators are phase-shift oscillators.

42. A sensor array according to claim 33, wherein the plurality of oscillators are Wien bridge oscillators.

43. A sensor array according to claim 33, wherein the signals from each of the plurality of oscillators are multiplexed onto the output using one of amplitude modulation, frequency modulation or digital multiplexing.

44. A sensor array according to claim 33, wherein the feedback network is one of a vibrating beam, a quartz piezoelectric crystal and an electronic circuit.

45. A sensor according to claim 33, wherein the feedback network is a mechanical device.

46. A sensor array according to claim 33, wherein the feedback network is an RC electronic circuit.

47. A sensor array according to claim 33, wherein the various parameters are selected from a. group consisting of temperatures, pressures, strains, flows or a combination thereof.

48. A sensor array according to claim 33, wherein the amplifier comprises an NMOS depletion load inverting high gain amplifier stage followed by a PMOS non-inverting low gain output stage.

49. A sensor array according to claim 33, wherein each of the frequencies of the plurality of oscillators belong to exclusive frequency bands.

50. A sensor array according to claim 33, wherein each of the frequencies of the plurality of oscillators belong to overlapping frequency bands.

51. A sensor array according to claim 33, wherein the signals from the plurality of oscillators are generally sinusoidal in form.

52. A sensor array according to claim 33, wherein the feedback network includes at least three high-pass filters.

53. A sensor array according to claim 52, wherein the feedback network includes four high-pass filters.

54. A sensor array according to claim 33, wherein the oscillators are energized only intermittently.

55. A sensor array according to claim 33, wherein the common output of the sensor array is defined by a power input common to the plurality of oscillators.

56. A sensor array according to claim 33, wherein the sensor array comprises wiring means connected to a power supply and through which a current is supplied to the amplifiers of the plurality of oscillators and wherein the common output of said sensor array comprises said wiring means.

57. A sensor array according to claim 56, wherein said wiring means comprises a single pair of wires.

* * * * *